(12) United States Patent
Lee et al.

(10) Patent No.: US 9,379,566 B2
(45) Date of Patent: Jun. 28, 2016

(54) APPARATUS AND METHOD FOR CONTROLLING CHARGE FOR BATTERY (71) Applicant: Hyundai Motor Company, Seoul (KR)

(72) Inventors: Woo-Young Lee, Chungcheongbuk-do (KR); Jin-Young Yang, Gyeonggi-do (KR); Byeong-Seob Song, Gyeonggi-do (KR); Dae-Woo Lee, Gyeongsangbuk-do (KR); In-Yong Yeo, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 75 days.

(21) Appl. No.: 14/243,223

(22) Filed: Apr. 2, 2014

(65) Prior Publication Data

US 2015/0162817 A1 Jun. 11, 2015

(30) Foreign Application Priority Data

Dec. 10, 2013 (KR) ........................ 10-2013-0152985

(51) Int. Cl.
*H02J 7/00* (2006.01)
*H02M 1/14* (2006.01)
*H02M 1/42* (2007.01)
*H02M 3/158* (2006.01)
(Continued)

(52) U.S. Cl.
CPC ............... *H02J 7/0052* (2013.01); *H02J 7/007* (2013.01); *H02M 1/14* (2013.01); *H02M 1/4225* (2013.01); *H02M 3/1588* (2013.01); *H02M 3/33569* (2013.01); *H02M 2001/007* (2013.01); *H02M 2001/0064* (2013.01); *H02M 2001/0096* (2013.01); *Y02B 70/126* (2013.01); *Y02B 70/1466* (2013.01)

(58) Field of Classification Search
CPC ..... H02J 7/0052; H02J 7/007; H02M 3/33569; H02M 3/1588; H02M 1/14; H02M 1/4225; H02M 2001/007; H02M 2001/0096; H02M 2001/0064; Y02B 70/126; Y02B 70/1466
See application file for complete search history.

(56) References Cited

U.S. PATENT DOCUMENTS 8,461,811 B2 6/2013 Porter et al.
2005/0030772 A1* 2/2005 Phadke ............... H02M 1/4225
363/71

(Continued)

FOREIGN PATENT DOCUMENTS

EP 2340961 A2 7/2011
EP 2620315 A2 7/2013
(Continued)

OTHER PUBLICATIONS

International Search Report for European Patent Application No. 14162097.1, dated Apr. 14, 2015, 7 pages.

*Primary Examiner* — Nha Nguyen
(74) *Attorney, Agent, or Firm* — Mintz Levin Cohn Ferris Glovsky and Popeo, P.C.; Peter F. Corless (57) ABSTRACT An apparatus for controlling a charge for a battery is provided. The apparatus includes an input unit that is configured to convert alternating current (AC) input power into direct current (DC) power. A first converter is configured to store or output the DC power and a circuit unit is configured to filter or boost output power based on a normal operation state or an instantaneous power failure state of the AC input power. In addition, a second converter is configured to convert the filtered or boosted power and supply the power to a high voltage battery.

17 Claims, 6 Drawing Sheets

(51) Int. Cl.
*H02M 3/335* (2006.01)
*H02M 1/00* (2006.01)

(56) References Cited

U.S. PATENT DOCUMENTS

2013/0026975 A1* 1/2013 Liu .................. H02J 7/022
320/107

2013/0088196 A1 4/2013 Chen et al.

FOREIGN PATENT DOCUMENTS

| JP | 2011015495 A | 1/2011 |
| KR | 10-2003-0011415 A | 2/2003 |
| KR | 10-2008-0036027 | 4/2008 |
| KR | 10-2011-0094634 | 8/2011 |
| KR | 10-2012-0122751 | 11/2012 |

* cited by examiner

APPARATUS AND METHOD FOR CONTROLLING CHARGE FOR BATTERY

CROSS-REFERENCE TO RELATED APPLICATIONS

This application claims the benefit of priority to Korean Patent Application No. 10-2013-0152985 filed on Dec. 10, 2013, the entire contents of which are incorporated herein by reference.

TECHNICAL FIELD

The present invention relates to a power factor correction (PFC) converter circuit, and more particularly, to an apparatus and a method for controlling a charge for a battery that reduces a PFC output voltage and/or current ripple and/or increases a hold-up time based on an output density of an on-board charger (OBC).

BACKGROUND

Figure 1:
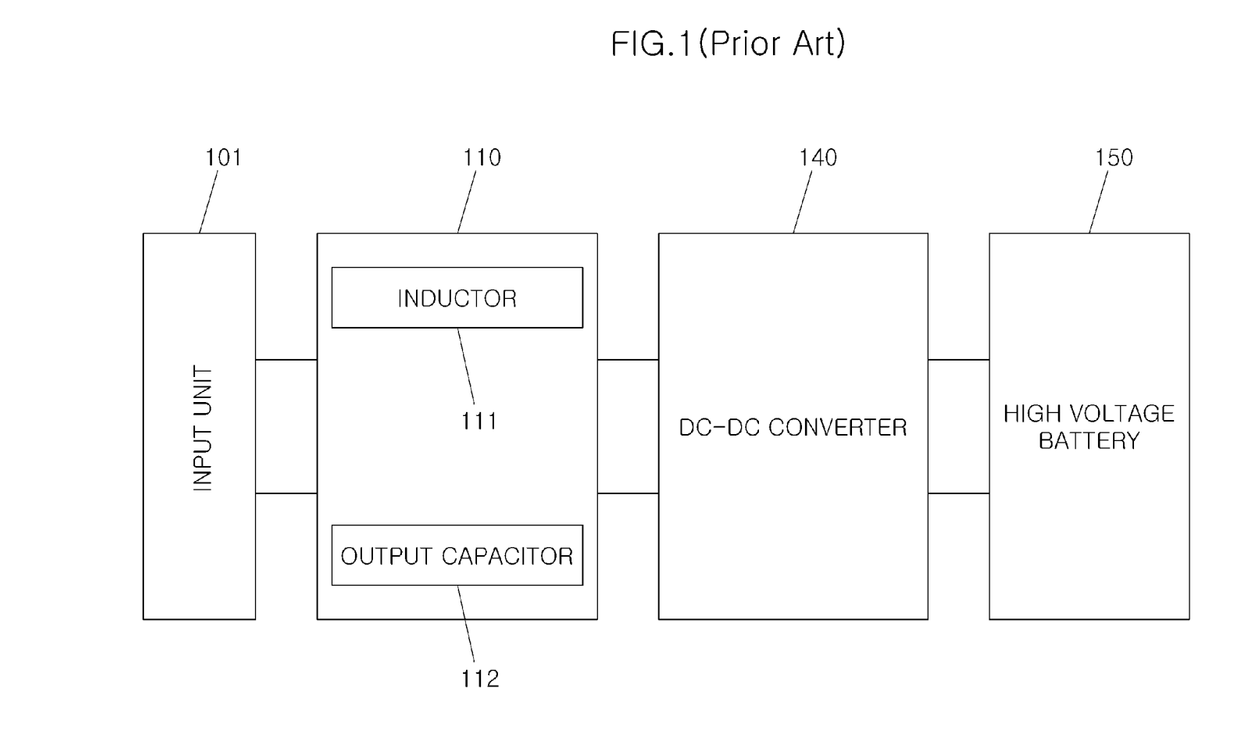
FIG. 1 is an exemplary configuration diagram of a general apparatus for controlling a charge for a battery according to the related art.

Generally, in connection with a development of an environmentally friendly vehicle, such as a plug-in hybrid and a hybrid vehicle, a converter for charging an alternating current-direct current (AC-DC) high voltage battery (hereinafter, OBC) may be an essential component. The OBC includes a power factor correction (PFC) converter to improve a power factor. An output terminal of the PFC needs to be provided with a large-capacity output power capacitor to absorb a voltage and current ripple and secure an instantaneous power failure hold-up time. This is schematically illustrated in FIG. 1. Referring to FIG. 1, a PFC converter circuit 110 is configured to include a PFC inductor 111, a PFC output capacitor 112, and the like. Further, the PFC converter circuit 110 is configured to further include an input unit 101, a DC-DC converter 140, a high voltage battery 150, and the like.

Herein, a concept of the hold-up time is briefly represented by the following Equation.

$$\tfrac{1}{2} C_{PFC}(V_{PFC\_cap}^2 - V_{min}^2) = \text{Power}_{out} \times T_{Hold\text{-}up} \qquad \text{Equation 1}$$

In the above Equation 1, the left side is proportional to a capacity of a capacitor as energy stored in the PFC output capacitor 112. In the above Equation 1, $V_{min}$ is a minimum PFC output voltage which may emit an OBC normal output. That is, to increase the hold-up time in the condition in which the OBC output is fixed, there is a need to increase a capacity C_pfc of the capacitor or a voltage V_pfc_cap applied to the capacitor.

However, since a separate circuit is not generally present in the vicinity of the PFC output capacitor, a voltage level of the capacitor may not be increased at the time of AC power instantaneous power failure. Therefore, to increase the hold-up time, only a method for increasing the capacity of the capacitor has been developed. Further, to reduce the PFC output voltage and/or current ripple, only a method for increasing a capacity of a PFC inductor and capacitor has been developed. This may increase the overall size and cost of the OBC, reduce an output density, and cause a problem of a configuration of a high voltage charging system package.

In other words, to reduce the voltage and current ripple of the output terminal of the PFC, there is a need to increase a magnitude in a capacitance of the output capacitor. However, since the capacitor is generally a component that occupies a largest volume within the OBC, there is a limitation in increasing the capacitance of the capacitor to improve the output density of the OBC. That is, an optimal capacity of the capacitor needs to be selected in consideration of the reduction in the output voltage ripple and/or the reduction in the package size of the OBC.

SUMMARY

An exemplary embodiment of the present invention is directed to an apparatus and a method for controlling a charge for a battery that may improve a power factor correction (PFC) output voltage in consideration of an output density of an on-board charger (OBC). Further, an exemplary embodiment of the present invention is directed to an apparatus and a method for controlling a charge for a battery capable of reducing a current ripple and/or increasing a hold-up time in consideration of an output density of an on-board charger (OBC). To achieve the above problem, an apparatus for controlling a charge for a battery is provided to improve a power factor correction (PFC) output voltage in consideration of an output density of an on-board charger (OBC).

The apparatus for controlling a charge for a battery may include: an input unit configured to convert alternating current (AC) input power into direct current (DC) power; a first converter configured to store or output the DC power; an additional circuit unit configured to filter or boost output power based on a normal operation state (e.g., when no failure occurs) or an instantaneous power failure state of the AC input power; and a second converter configured to convert the filtered or boosted power and supply the power to a high voltage battery.

The first converter may include: a first inductor; and a first output capacitor configured to be connected to the first inductor in parallel. The additional circuit unit may include: a second inductor configured to be connected to the first inductor in series and connected to the first output capacitor in parallel; a second output capacitor configured to be connected to the first output capacitor in parallel; a first switch configured to be connected to the second inductor in parallel; and a second switch configured to be connected to the second inductor in series.

When the AC input power is in the normal operation state, the first switch may maintained a turned off state (e.g., may remain turned off) and the second switch may hold a turn on state (e.g., may remain turned on). The first inductor and the first output capacitor may be a one-stage filter and the second inductor and the second output capacitor may be a two-stage filter. When the AC input power is in the instantaneous power failure state, the first switch and the second switch may be in an alternately turned on or off state.

A voltage of the first output capacitor may be boosted and thus may be stored in the second output capacitor to increase a hold-up time. The second inductor may be a low-capacity inductor which is equal to or smaller than the first inductor and the second output capacitor may be a low-capacity capacitor which is equal to or smaller than the first output capacitor. The second converter may be a direct current-direct current (DC-DC) converter.

A method for controlling a charge for a battery may include the steps of: converting input power to convert alternating current (AC) input power into direct current (DC) power; storing or outputting the DC power; filtering or boosting output power based on a normal operation state or an instantaneous power failure state of the AC input power; and converting the filtered or boosted power and supply the power to a high voltage battery. The storing or outputting may be performed using a first converter. The filtering or boosting may be performed using an additional circuit unit.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Since the present invention may be variously modified and have several exemplary embodiments, specific exemplary embodiments will be shown in the accompanying drawings and be described in detail in a detailed description. However, it is to be understood that the present invention is not limited to the specific exemplary embodiments, but includes all modifications, equivalents, and substitutions included in the spirit and the scope of the present invention. Throughout the accompanying drawings, the same reference numerals will be used to describe the same components.

Terms used in the specification, 'first', 'second', etc., may be used to describe various components, but the components are not to be construed as being limited to the terms. The terms are used to distinguish one component from another component. For example, the 'first' component may be named the 'second' component and the 'second' component may also be similarly named the 'first' component, without departing from the scope of the present invention. The term 'and/or' includes a combination of a plurality of items or any one of a plurality of terms.

Unless indicated otherwise, it is to be understood that all the terms used in the specification including technical and scientific terms has the same meaning as those that are understood by those who skilled in the art. It must be understood that the terms defined by the dictionary are identical with the meanings within the context of the related art, and they should not be ideally or excessively formally defined unless the context clearly dictates otherwise.

Hereinafter, an apparatus and a method for controlling a charge for a battery according to an exemplary embodiment of the present invention will be described in detail with reference to the accompanying drawings.

Figure 2:
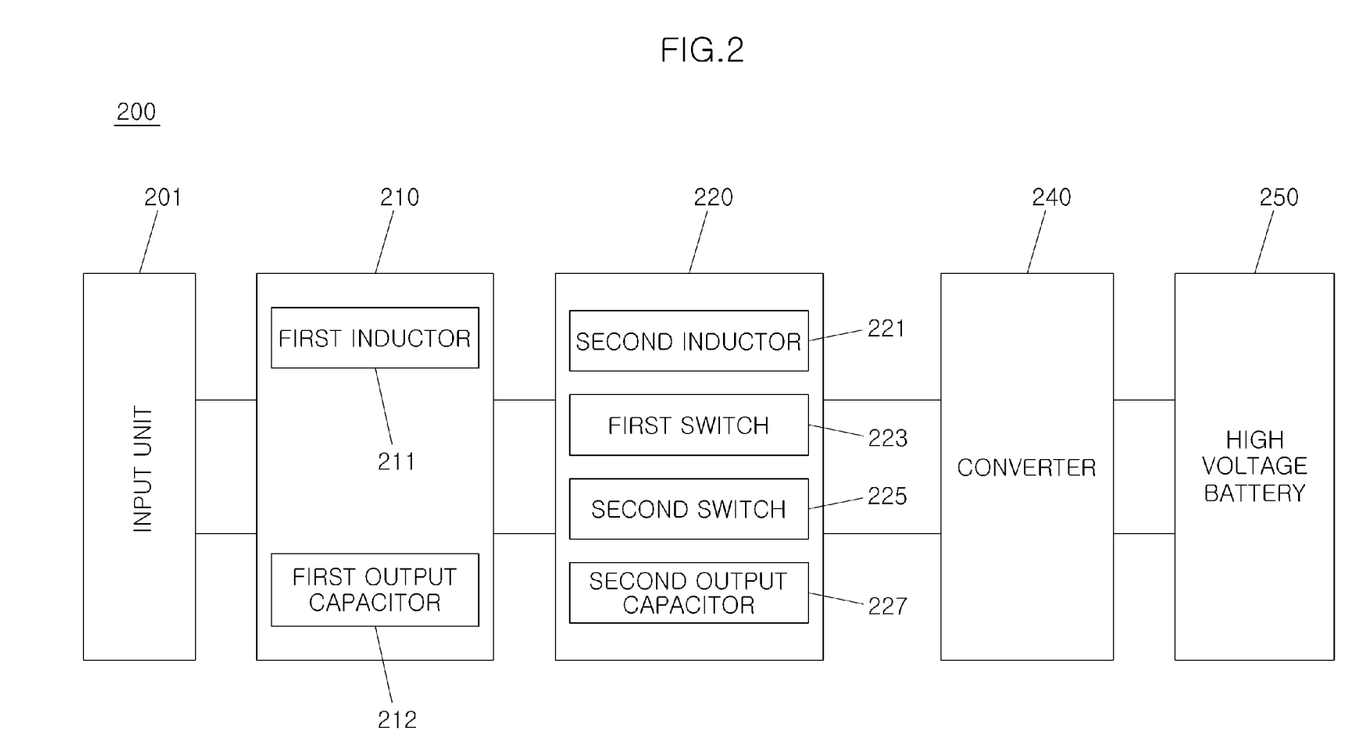
FIG. 2 is an exemplary block configuration diagram of an apparatus 200 for controlling a charge for a battery according to an exemplary embodiment of the present invention.

FIG. 2 is an exemplary block configuration diagram of an apparatus 200 for controlling a charge for a battery according to an exemplary embodiment of the present invention. Referring to FIG. 2, the apparatus 200 for controlling a charge for a battery may include an input unit 201 configured to convert alternating current (AC) input power into direct current (DC) power, a first converter 210 configured to store or output the DC power, an additional circuit unit 220 configured to filter or boost output power based on a normal operation state (e.g., when no failure occurs) or an instantaneous power failure state of the AC input power, and a second converter 240 configured to convert the filtered or boosted power and supply the converted power to a high voltage battery 250, and the like.

The input unit 201 may be configured to remove an AC component of power to make a DC component. Therefore, the input unit 201 may include a half-wave rectification circuit, a full-wave rectification circuit, a bridge full-wave rectification circuit, and the like. The first converter 210 may be a power factor correction (PFC) converter and may include a first inductor 211, a first output capacitor 212, and the like. Further, the second converter 240 may be a direct current-direct current (DC-DC) converter. The DC-DC converter is widely known, and therefore will no longer be described to clearly understand the present invention.

The power factor correction (PFC) may be a power saving circuit to improve power efficiency in a power supply apparatus, and a satisfactory PFC type may have harmonics without an (e.g., sinusoidal form) input line current having a substantially unique power factor on a change in a wide load, satisfactory wiring and load adjustment having a right output dynamic, a substantially small size, a substantially light weight, decreased number of components, economic efficiency, high power conversion efficiency, and low electromagnetic interference.

The additional circuit unit 220 may include a second inductor 221, a second output capacitor 227, first and second switches 223 and 225, and the like which may be operated by being connected to the first inductor 211 and the first output capacitor 212 of the first converter 210. Further, the additional circuit unit 220 may be operated as a two-stage filter or a boost converter by controlling a turn on and/or off of the first switch 223 and/or the second switch 225 based on a normal operation state (that is, AC-free instantaneous power failure state) or an AC instantaneous power failure state.

In other words, the normal operation state is as follows. The first converter 210 and the second converter 240 may be the same as a general operation. In the additional circuit unit 220, the first switch 223 may always be turned off and the second switch 225 may always be turned on. Accordingly, the two-stage filter may be disposed at the output to reduce a PFC output voltage and current ripple. In other words, a one-stage filter may include the first inductor 211 and the first output capacitor 212 and the two-stage filter may include the second inductor 221 and the second output capacitor 227.

The AC instantaneous power failure state is as follows. The first converter 210 and the second converter 240 may be the same as a general operation. In the additional circuit unit 220, the first switch 223 and the second switch 225 may be alternately switched and thus may be operated as the boost converter. In other words, the voltage of the first output capacitor 212 may be boosted and thus may be stored in the second output capacitor 227. This will be represented by the following Equation.

$$\frac{1}{2}(C_{PFC1}+C_{PFC2})(V_{PFC\_cap2}^2-V_{min}^2) \approx \frac{1}{2}C_{PFC1}$$
$$(V_{PFC\_cap2}^2-V_{min}^2) = \text{Power}_{out} \times T_{Hold\text{-}up}$$ Equation 2

In the above Equation 2, $C_{PFC1}$ represents a capacity of the first output capacitor, $C_{PFC2}$ represents a capacity of the second output capacitor, $V_{min}$ represents a minimum PFC output voltage which may emit a normal output, $T_{Hold\text{-}up}$ represents a hold-up time, and $V_{PFC\_cap2}$ represents a voltage applied to the second output capacitor. The normal output may be when a constant power is maintained at the output terminal. In other words, the normal output may be when the Power$_{out}$ is in a state of stability. The second output capacitor is smaller than the first output capacitor and therefore may be substantially disregarded. The Equation of the hold-up time according to the exemplary embodiment of the present invention may depend on the above Equation 2 and since a $V_{pfc\_cap2}$ voltage may be held for a substantial period of time compared to a generally known technology, the hold-up time may be increased. In other words, the energy stored in the first output capacitor 212 may be sufficiently used to increase the hold-up time.

Figure 3:
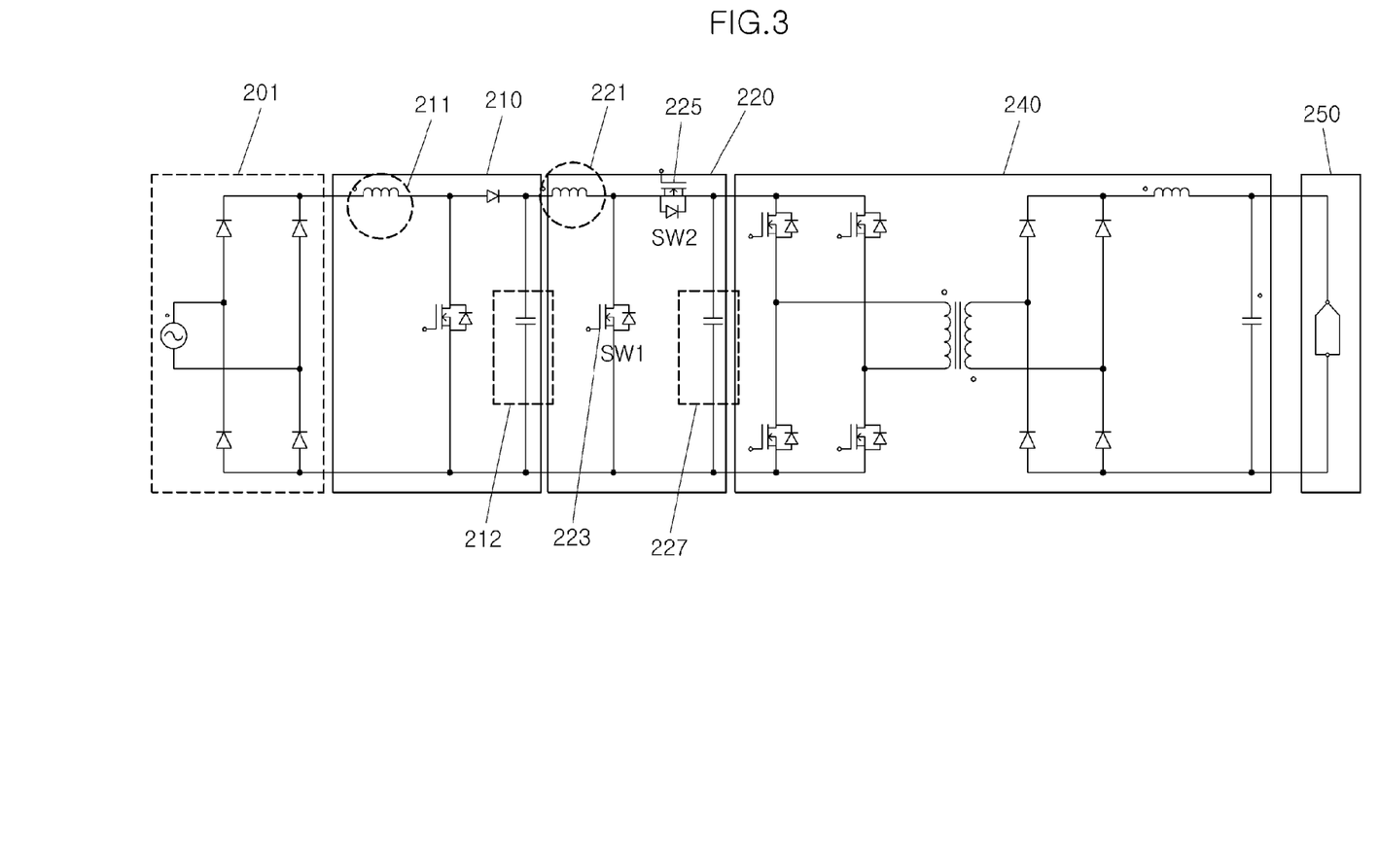
FIG. 3 is an exemplary diagram illustrating a circuit diagram of the apparatus 200 for controlling a charge for a battery illustrated in FIG. 2 according to an exemplary embodiment of the present invention.

FIG. 3 is an exemplary diagram illustrating a circuit diagram of the apparatus 200 for controlling a charge for a battery illustrated in FIG. 2. Referring to FIG. 3, the input unit 201 may be configured of a bridge diode circuit. The first converter 210 may include the first inductor 211, the first output capacitor 212 connected to the first inductor 211 in parallel, the switching devices, and the like.

Further, the additional circuit unit 220 may include the second inductor 221 connected to the first inductor 211 in series and connected to the first output capacitor 212 in parallel, the second output capacitor 227 connected to the first output capacitor 212 in parallel, the first switch 223 connected to the second inductor 221 in parallel, and the second switch 225 connected to the second inductor 221 in series, and the like. In particular, as the first and second switches 223 and 225, a field effect transistor (FET), a TRIAC, a silicon controlled rectifier (SCR), a diode alternating current (DIAC), a relay, an insulated gate bipolar transistor (IGBT), and the like may be used. In addition, the second inductor 221 may be a low-capacity inductor which may be equal to or smaller than the first inductor 211. The second output capacitor 227 may be a low-capacity capacitor which may be equal to or smaller than the first output capacitor 212.

In the normal state, the first switch 221 may always be turned off and the second switch 225 may always be turned on to apply the two-stage filter to the PFC output, and thus, reducing the PFC output voltage and/or current ripple. In other words, the first inductor 211 and the first output capacitor 212 may be a first stage filter and the second inductor 221 and the second output capacitor 227 may be a second stage filter. Therefore, at the time of a design to show up the output ripple of the equivalent level compared to the generally known technology, the capacity of the first output capacitor 212 and the first inductor 211 which have a substantially large capacity may be reduced. Therefore, comparing the overall size and cost with the general technology, it may be designed at the equivalent level or smaller.

Further, in the AC instantaneous power failure state, the first and second switches 223 and 225 may be alternately switched and thus may be operated as the boost converter. Therefore, the voltage of the first output capacitor 212 may be boosted and stored in the second output capacitor 227 to increase the time when the PFC output voltage is reduced to a minimum voltage V_min which may emit a normal output of an on-board charger, thereby holding the OBC normal output for a substantial period of time compared to the generally known technology. Accordingly, an increase in the hold-up time occurs. Therefore, it may be possible to reduce the capacitance of the PFC output capacitor at the time of the design to maintain the hold-up time of the equivalent level to the generally known technology. In addition, the cost may be reduced and the overall size of the OBC may be reduced.

The hold-up time may be the time to continuously hold the output of the OBC during the AC power instantaneous power failure by using the energy stored in the output capacitor. During the AC power instantaneous power failure, when the OBC output is held using the energy stored in the capacitor, the voltage of the capacitor may decrease and an arrival time to the minimum voltage level to hold the OBC output may become a hold-up time. Therefore, when the voltage of the capacitor is increased before the OBC output holding minimum voltage is reached, the arrival time to the OBC output holding minimum voltage level may increase and therefore the hold-up time may increase.

Figure 4:
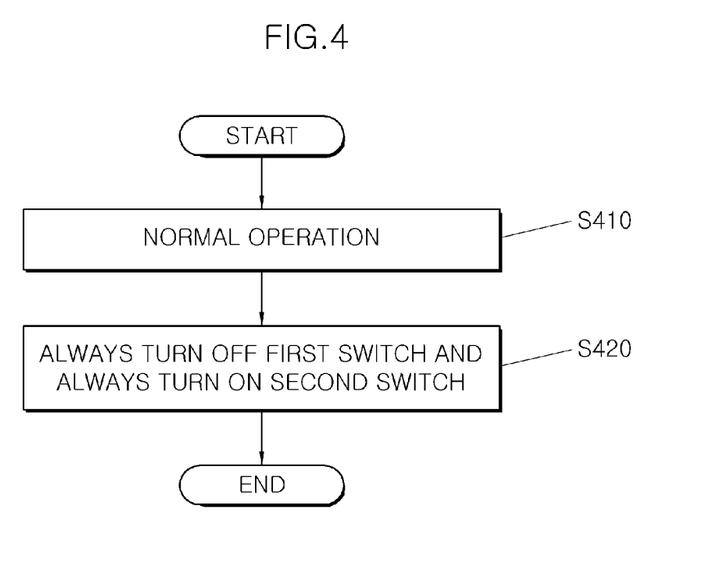
FIG. 4 is an exemplary flow chart illustrating an operation process of switches 223 and 225 at the time of a normal operation according to an exemplary embodiment of the present invention.

FIG. 4 is an exemplary flow chart illustrating an operation process of switches 223 and 225 during a normal operation according to an exemplary embodiment of the present invention. Referring to FIG. 4, when the AC input power of the input unit 201 (FIG. 3) is in the normal operation state, the first switch 223 (FIG. 3) may always be turned off and the second switch 225 may always be turned on (steps S410 and S420). In particular, the first converter 210 and the additional circuit unit 220 may be operated as the two-stage filter.

Figure 5:
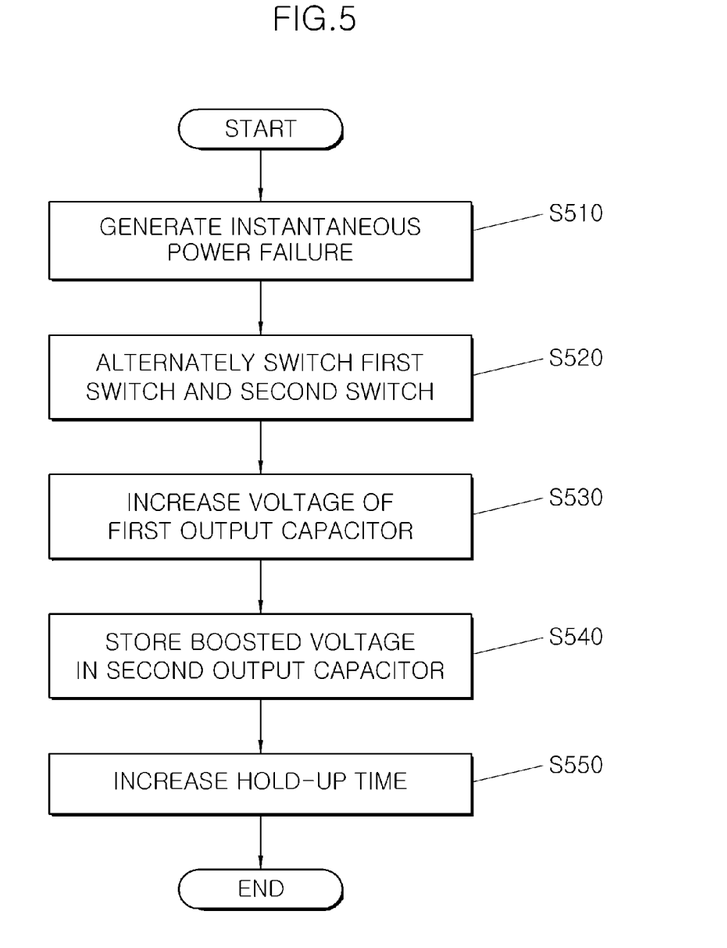
FIG. 5 is an exemplary flow chart illustrating a process of increasing a hold-up time based on an operation of the switches 223 and 225 and capacitors 212 and 227 at the time of a generation of an instantaneous power failure according to another exemplary embodiment of the present invention.

FIG. 5 is an exemplary flow chart illustrating a process of increasing a hold-up time based on an operation of the switches 223 and 225 and capacitors 212 and 227 during a generation of an instantaneous power failure according to another exemplary embodiment of the present invention. Referring to FIG. 5, when the AC input power of the input unit 201 (FIG. 3) is in the instantaneous power failure state, the first switch 223 and the second switch 225 may be alternately switched every predetermined period, that is, at predetermined intervals (steps S510 and S520). The voltage of the first output capacitor 212 (FIG. 3) may be boosted by the alternative switching and the boosted voltage may be stored in the second output capacitor 227 (FIG. 3) (steps S530 and S540). The boosted voltage may be stored in the second output capacitor 227 and thus the hold-up time may increase (step S550).

Figure 6:
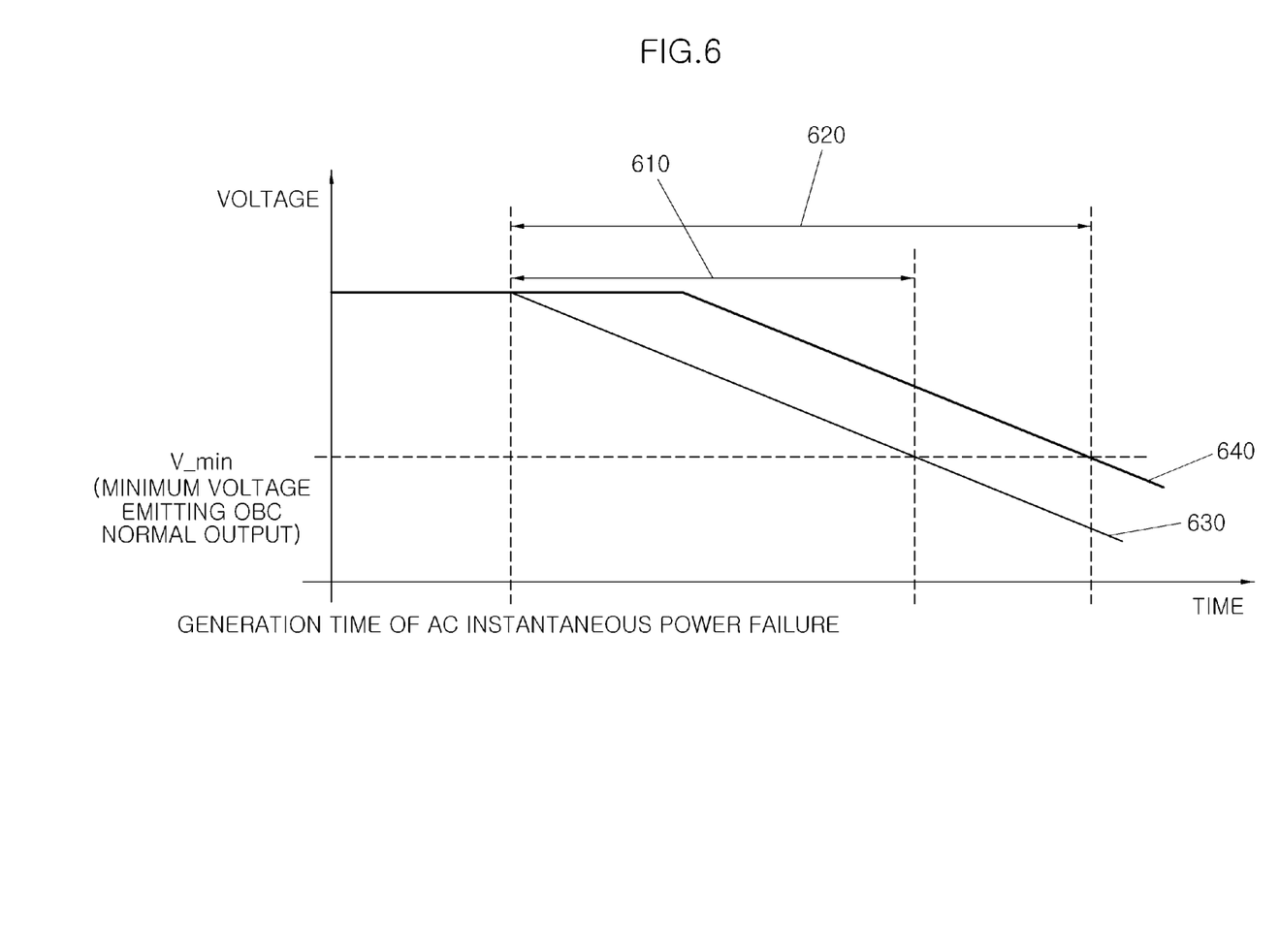
FIG. 6 is an exemplary graph comparing a general hold-up time to a hold-up time according to an exemplary embodiment of the present invention.

FIG. 6 is an exemplary graph comparing a general hold-up time to a hold-up time according to an exemplary embodiment of the present invention. Referring to FIG. 6, according to the exemplary embodiment of the present invention, a hold-up time 620 may be greater than a general hold-up time 610 (e.g., a conventional hold-up time). Further, according to the exemplary embodiment of the present invention, a voltage 640 of the second output capacitor may be more stably held than a voltage of the general output capacitor.

According to the exemplary embodiments of the present invention, the inductor, the switch, and the output capacitor may be configured in plural to control the turning on and off of the plurality of switches during the normal operation and the generation of AC instantaneous power failure, thus reducing the PFC output voltage and current ripple. Further, one switch may always be turned off and the remaining switches may always be turned on to apply the two-stage filter to the PFC output, thus reducing the capacity of the PFC output inductor and the output capacitor. Accordingly, the cost may be reduced and the overall size of the on-board charger (OBC) may be reduced.

In addition, according to the exemplary embodiments of the present invention, the plurality of switches may be alternately switched at the time of the generation of the AC instantaneous power failure, and as a result may be operated as the boost converter. In other words, the voltage of one PFC output capacitor may be boosted and stored in another PFC output capacitor to increase the time when the PFC output voltage is reduced to the minimum voltage V_min which may emit the OBC normal output, to maintain the OBC normal output with respect to the general circuit for a substantial period of time. Accordingly, an increase in the hold-up time may occur. Therefore, it may be possible to reduce the capacity of the PFC output capacitor at the time of a design to maintain the hold-up time of the equivalent level to the related circuit. Thus, the cost may be reduced and the overall size of the OBC may be reduced.

Hereinabove, although the present invention is described by specific matters such as concrete components, and the like, exemplary embodiments, and drawings, they are provided merely for assisting in the entire understanding of the present invention. Therefore, the present invention is not limited to the exemplary embodiments. Various modifications and changes may be made by those skilled in the art to which the present invention pertains from this description.

What is claimed is:

1. An apparatus for controlling a charge for a battery, comprising:
    an input unit configured to convert alternating current (AC) input power into direct current (DC) power;
    a first converter having a first inductor and a first output capacitor connected in parallel to the first inductor configured to store or output the DC power;
    a circuit unit having a second inductor, a first switch and a second switch configured to filter and boost output power at the same time based on a normal operation state and an instantaneous power failure state of the AC input power; and
    a second converter configured to convert the filtered or boosted power and supply the power to a high voltage battery.

2. The apparatus of claim 1, wherein the circuit unit includes:
    the second inductor connected in series to the first inductor and connected in parallel to the first output capacitor;
    a second output capacitor connected in parallel to the first output capacitor;
    the first switch connected in parallel to the second inductor; and
    the second switch connected in series to the second inductor.

3. The apparatus of claim 2, wherein when the AC input power is in the normal operation state, the first switch remains turned off and the second switch remains turned on.

4. The apparatus of claim 3, wherein the first inductor and the first output capacitor form a one-stage filter and the second inductor and the second output capacitor form a two-stage filter.

5. The apparatus of claim 2, wherein when the AC input power is in the instantaneous power failure state, the first switch and the second switch are alternately turned on and off.

6. The apparatus of claim 5, wherein a voltage of the first output capacitor is boosted and is stored in the second output capacitor to increase a hold-up time.

7. The apparatus of claim 2, wherein the second inductor is a low-capacity inductor which is equal to or smaller than the first inductor and the second output capacitor is a low-capacity capacitor which is equal to or smaller than the first output capacitor.

8. The apparatus of claim 1, wherein the second converter is a direct current-direct current (DC-DC) converter.

9. A method for controlling a charge for a battery, comprising:
    converting, by an input unit, alternating current (AC) input power into direct current (DC) power;
    storing or outputting, by a first converter having a first inductor and a first output capacitor connected in parallel to the first inductor, the DC power;
    filtering and boosting, by a circuit unit, output power based on a normal operation state and an instantaneous power failure state of the AC input power at the same time, wherein the circuit unit includes a second inductor, a first switch and a second switch; and
    converting, by a second converter, the filtered or boosted power and supply the power to a high voltage battery.

10. The method of claim 9, wherein the circuit unit includes:
    the second inductor connected in series to the first inductor and connected in parallel to the first output capacitor;
    a second output capacitor connected in parallel to the first output capacitor;
    the first switch connected in parallel to the second inductor; and
    the second switch connected in series to the second inductor.

11. The method of claim 10, wherein when the AC input power is in the normal operation state, the first switch remains turned off and the second switch remains turned on.

12. The method of claim 11, wherein the first inductor and the first output capacitor form a one-stage filter and the second inductor and the second output capacitor form a two-stage filter.

13. The method of claim 10, wherein when the AC input power is in the instantaneous power failure state, the first switch and the second switch are alternately turned on and off.

14. The method of claim 13, wherein a voltage of the first output capacitor is boosted and is stored in the second output capacitor to increase a hold-up time.

15. The method of claim 10, wherein the second inductor is a low-capacity inductor which is equal to or smaller than the first inductor and the second output capacitor is a low-capacity capacitor which is equal to or smaller than the first output capacitor.

16. The method of claim 9, wherein the second converter is a direct current-direct current (DC-DC) converter.

17. An apparatus for controlling a charge for a battery, comprising:
    an input unit configured to convert alternating current (AC) input power into direct current (DC) power;

a first converter configured to store or output the DC power, wherein the first converter includes: a first inductor; and a first output capacitor connected in parallel to the first inductor;

a circuit unit configured to filter and boost output power at the same time based on a normal operation state or an instantaneous power failure state of the AC input power, wherein the circuit unit includes: a second inductor connected in series to the first inductor and connected in parallel to the first output capacitor; a second output capacitor connected in parallel to the first output capacitor; a first switch connected in parallel to the second inductor; and a second switch connected in series to the second inductor; and a second converter configured to convert the filtered or boosted power and supply the power to a high voltage battery, wherein, when the AC input power is in the instantaneous power failure state, the first switch and the second switch are alternately turned on and off.

* * * * *